(12) United States Patent
Ameline et al.

(10) Patent No.: US 8,422,776 B2
(45) Date of Patent: Apr. 16, 2013

(54) TRANSPARENCY AND/OR COLOR PROCESSING

(75) Inventors: Ian R. Ameline, Toronto (CA); Michael C. Daum, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 963 days.

(21) Appl. No.: 11/869,243

(22) Filed: Oct. 9, 2007

(65) Prior Publication Data

US 2008/0101691 A1 May 1, 2008

Related U.S. Application Data

(62) Division of application No. 10/927,510, filed on Aug. 27, 2004, now Pat. No. 7,302,094.

(51) Int. Cl.
*G06K 9/00* (2006.01)

(52) U.S. Cl.
USPC ............................................. 382/165

(58) Field of Classification Search .................. None
See application file for complete search history.

(56) References Cited

U.S. PATENT DOCUMENTS

| | | | | |
|---|---|---|---|---|
| 5,065,234 A * | 11/1991 | Hung et al. | | 358/523 |
| 5,335,292 A * | 8/1994 | Lovelady et al. | | 382/163 |
| 5,485,556 A * | 1/1996 | Takagi et al. | | 345/426 |
| 5,956,015 A * | 9/1999 | Hino | | 345/600 |
| 6,128,001 A * | 10/2000 | Gonsalves et al. | | 345/589 |
| 6,134,345 A | 10/2000 | Berman et al. | | |
| 6,134,346 A | 10/2000 | Berman et al. | | |
| 6,288,703 B1 | 9/2001 | Berman et al. | | |
| 7,072,508 B2 * | 7/2006 | Dance | | 382/167 |
| 7,652,794 B2 * | 1/2010 | Lee | | 358/3.26 |
| 2001/0036229 A1 * | 11/2001 | Chen et al. | | 375/240.08 |

* cited by examiner

*Primary Examiner* — Samir Ahmed
(74) *Attorney, Agent, or Firm* — Staas & Halsey LLP (57) ABSTRACT

A system or method of automated image processing that can automatically determine a color and transparency for a pixel with an observed color when given the pixel and a background reference color. A point in a color space can be automatically found by extrapolating in the color space based on two points in the color space that respectively correspond to or that respectively approximate the observed color and the given background reference color. A color for the given pixel that corresponds to or approximates the found point in the color space can also be calculated automatically. Based on the found point and the two points in the color space that respectively correspond to the observed color and the given reference color, a transparency for the pixel can be automatically found.

13 Claims, 11 Drawing Sheets

RELATED ART

TRANSPARENCY AND/OR COLOR PROCESSING

CROSS REFERENCE TO RELATED APPLICATION

This application is a divisional of U.S. application Ser. No. 10/927,510 filed Aug. 27, 2004 now U.S. Pat. No. 7,302,094 which is currently allowed and incorporated herein by reference.

BACKGROUND OF THE INVENTION

1. Field of the Invention

The present invention relates to the field of image processing. In particular, the present invention relates to automatically finding transparencies and colors for pixels to mimic de-blending color of a physical medium such as paper and color of a coloring substance such as ink applied thereto.

2. Description of the Related Art

Various devices such as electronic pens, pressure sensitive pads, etc. are available to allow artists to make digital sketches or drawings. However, often, designers or artists prefer to make a sketch or drawing on paper and then scan it into digital form. In digital form, a sketch or drawing may be further refined, or used to assist the designer in the initial stage of building a 3-D model, or used as a texture, and so on. Using a scanned drawing to these ends generally requires an image of the drawing that is transparent where there is no color or ink in the image. To use an image of a sketch or drawing as a layer in another image or in a 3-D model, the artist needs an image that is generally transparent where they have not drawn anything, and that is generally opaque where they have.

Paper has been rendered fully transparent algorithmically by making transparent those pixels of an image that have a color the same as or close to a color of the paper. For example, given a scanned image of a drawing on yellow paper, all pixels close in color distance to the yellow paper color would be made transparent. This approach does not allow pixels to be partially transparent and visual artifacts are common. Where partial transparency has been used, the transparency processing has not been able to preserve hues and saturations of original image colors.

Other techniques for rendering the paper of a scanned drawing transparent have been labor-intensive and have produced unsatisfactory results. In Adobe Photoshop, a magic wand can be used to select regions of a generally uniform color, and a mask tool can be used to mask an image according to a color range. However, these labor-intensive techniques also do not produce images with opacities, hues, or saturations that appear natural or expected.

SUMMARY OF THE INVENTION

It is an aspect of one or more embodiments described herein to automatically produce a digital image that naturally depicts the coloring agent or "ink" of a drawing de-blended from the physical medium or "paper" of the drawing.

It is an aspect of one or more embodiments described herein to produce a digital image of the coloring agent or "ink" of a figure by automatically rendering some pixels transparent or semi-transparent while preserving natural or intuitive color qualities such as hue and saturation.

It is an aspect of one or more embodiments described herein to automatically remove paper from an image without producing artifacts such as halo effects.

It is an aspect of one or more embodiments described herein to automatically determine colors and transparency levels for pixels of an image based on a given color or range, which may correspond to a background or paper color.

It is an aspect of one or more embodiments described herein to provide a method that can be applied to an original image of any arbitrary "ink" (physical color) and "paper" (physical medium) and yet, with little or no user input, produces an image with transparencies and colors that reflect natural removal of a paper or background color from the image.

It is an aspect of one or more embodiments described herein to extrapolate from a given color and an original pixel color to find a new color and transparency for a pixel.

It is an aspect of one or more embodiments described herein to find a transparency for a pixel by first finding a point extrapolated from a given background or paper color and an original color, and then basing the transparency on a ratio of the color distance between the original pixel color and the given background or paper color, and the color distance between the extrapolated point and the given color.

It is an aspect of one or more embodiments described herein to produce an image by maintaining original pixel colors that are close to a given original or observed pixel color, by rendering transparent pixels that are close to a given color background or paper color, and by otherwise interpolating between these and extrapolated colors/transparencies.

It is an aspect of one or more embodiments described herein to produce, from an original image an image with pixels rendered transparent or semi-transparent according to a given background or paper color, and where the produced image, if blended over the given background or paper color would produce an image approximately equivalent to the original image.

The above aspects can be attained by a system or method of automated image processing that can automatically determine a calculated ink color and calculated transparency for a pixel when provided with an observed color for that pixel, and a given background or paper color. A point in a color space can be automatically found by extrapolating in the color space from the point represented by the given paper color through the point represented by the observed color. A value for the paper color (or given color) can also be found automatically. Based on the calculated color point and the two original points in the color space that respectively correspond to the observed color and the given paper color, a transparency for the pixel can be automatically found. Transparency for the pixel may be determined based on: a color distance in the color space between the point corresponding to or approximating the paper color and the point corresponding to or approximating the observed color; and a color distance in the color space between the point of the paper color and the calculated ink color point. The transparency may be based on a ratio of those color distances. The calculation may be performed by finding any point in the color space on an extrapolated color vector in the color space. The calculated point may be on the color vector defined by an origin corresponding to the given paper color and another point in the color space that corresponds to the observed color. Furthermore, the calculated point may produce reasonable results when it is at an intersection of the above vector and the boundary of the color space.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE INVENTION

As discussed in the Background above, it has not previously been possible to automatically de-blend from an image a given color such as a paper color to produce a digital equivalent of an artist's figure of ink, pencil graphite, paint, etc. as though it had been applied to a transparent surface rather than to paper or some other physical medium. Artists have not been able to accurately, quickly, and easily use their physical subjects, drawings, paintings etc. in digital form with a reference or background color naturally de-blended therefrom.

Figure 1:
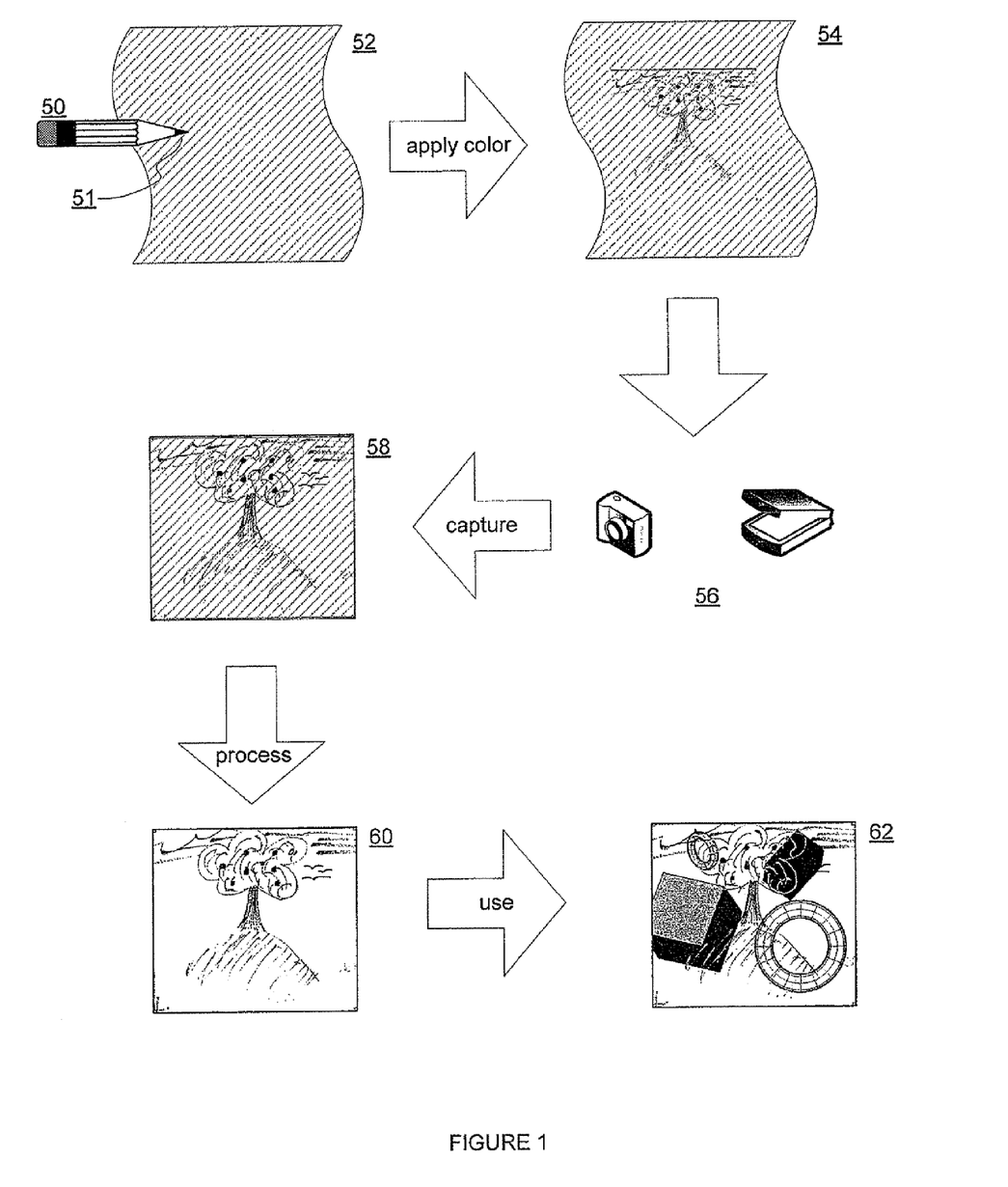
FIG. 1 shows a process that is an example of a context in which techniques discussed below may be used.

FIG. 1 shows a process that is an example of a context in which techniques discussed below may be used. A person may start by using a pencil or other coloring tool(s) 50 to apply coloring substance(s) 51 to paper or some other physical medium or surface 52. The resulting physical drawing or subject 54 is captured by a capture device 56 such as a scanner or a CCD-based device, thus producing an original digital image 58 of the subject 54. The original digital image 58 is processed (as discussed later) to produce an image 60 from which a color such as the color of the paper 54 has been de-blended. The de-blended image 60 may then be used for any number of purposes such as layering onto another image or model to produce some other digital work 62.

Figure 2:
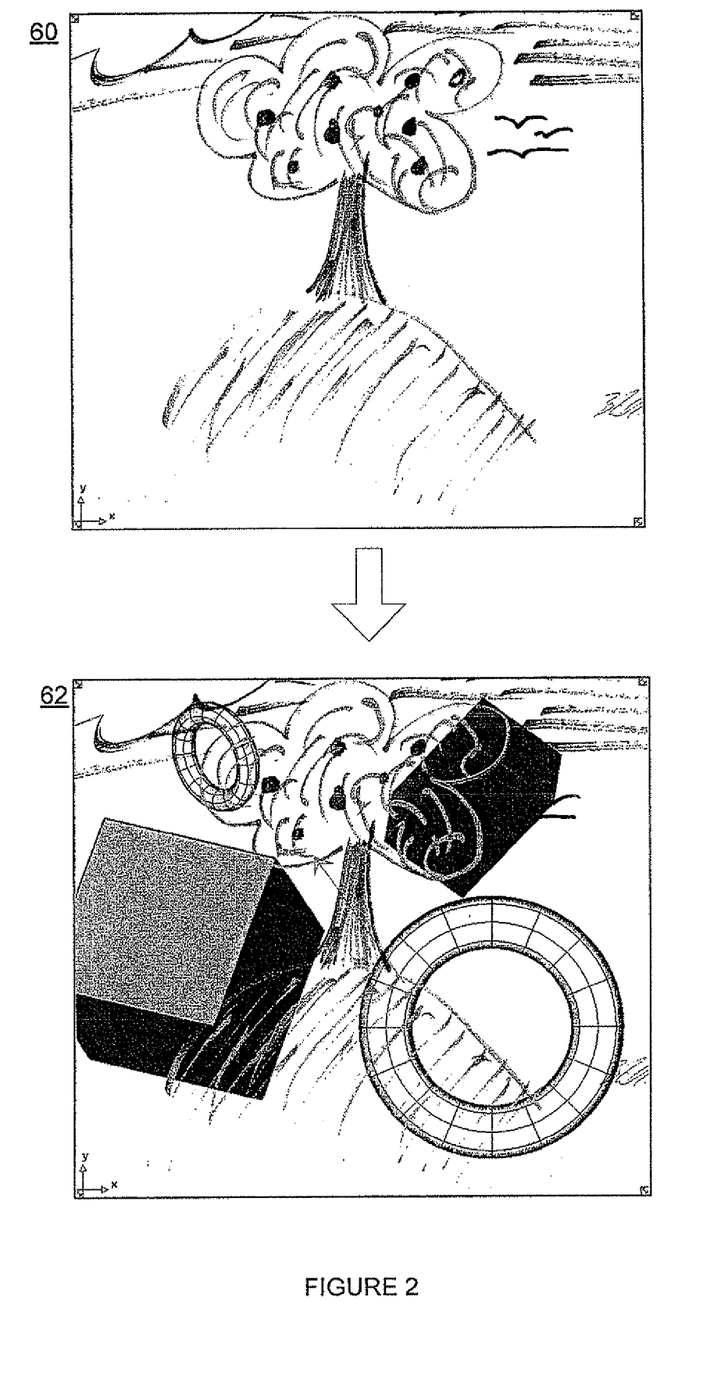
FIG. 2 shows a close view of a de-blended image and an image produced by its overlay onto another image.

FIG. 2 shows a close view of a de-blended image 60 and an image 62 produced by its overlay onto another image. The de-blended image 60 is from an actual scanned image of an original drawing 54 produced with markers and paper. The transparent aspect of the de-blended image 60 can be seen in details of the overlay image 62. For example, in overlay image 62 where the upper right proportion of the drawn tree overlaps the front face of the block on the right hand side of the figure, the color of the block can be seen within some strokes. Transparency and semi-transparency within a stroke can also be seen in strokes that transition from one overlaid color to another. The overlay image 62 appears as if the artist has drawn the figure directly onto the overlay image 62. Color information is limited or distorted in black and white figures. However, color images would show saturations and hues closely matching the original hand drawn marker figure.

For understanding image processing techniques discussed herein, some definitions are to be considered. Although definitions are grouped in this paragraph, other definitions may or may not appear elsewhere herein. As used herein, the term "coloring substance" is defined to mean a substance or agent that imparts color to other materials to which it is applied and can be used for artistic expression. The term is defined to include at least substances such as paints, inks including marker inks, waxes, charcoals, graphite, watercolors, dyes, pigments, and other substances for imparting color. "Ink" is sometimes used as a short substitute for "coloring substance." As used herein, the term "medium" is defined to mean a material or surface for technical means of artistic expression and in particular material that is used to receive a coloring substance. For example, paper, whiteboard, chalkboard, cloth, and so on. "Opacity" and "transparency" are defined to be equivalent in that they represent the same basic image property, but they are the inverse of each other—full transparency is equivalent to no opacity, and full opacity is equivalent to no transparency. An Alpha value of 0 is equivalent to full transparency, and an Alpha value of 1 is equivalent to full opacity. One skilled in the art of image processing will recognize that, considering this inverse relationship, "Alpha", "opacity" and "transparency" are interchangeable, and where one is used herein, the other is considered also to be mentioned. According to this definition, "level of transparency", for example, means "level of transparency or level of opacity". As another example, "full transparency" means "full transparency or no opacity". A "captured image" is defined to include at least image data captured from a capture device such as a scanner and image data based thereon. For example, a captured image is defined to include scanned images that have been filtered (e.g. adjusted for gradient, hue, contrast, etc.), edited (e.g. masked, retouched, resized, etc.), and so on, while retaining the basic character of a subject 54 depicted in the image. A captured image forms a two dimensional collection of "observed colors". An "observed color" is defined to mean a color at a particular pixel that is observed by a scanner or camera, possibly after some adjustment as mentioned above. The term "background" or "paper color" is defined to be a term of convenience for a reference color; any color can be a background or reference color, or colors closely clustered around such color. A "substantially uniform color" is used to indicate a set of close-appearing colors. For example, a blank piece of paper will have a substantially uniform color with most color values falling within a large portion of a color distribution curve typical for paper. Other mediums or coloring substances may have more variance or noise than paper. "Substantially transparent" is used to indicate a level of transparency that a human would perceive to be essentially transparent, and is intended to clarify that transparency is not limited to strictly full or 100% transparency. An "image" is defined to include both the traditional meaning as well as a sub-portion of some other image. Techniques discussed below can be applied to images that are portion of larger images. The term "calculated ink color" is the color at a particular pixel that is calculated and represents a close approximation of the color of the pigment or coloring substance used to produce that pixel. This is also called "de-blended" color. The term "calculated transparency" is a transparency of a pixel which approximates the density of the coloring substance or pigment of the calculated ink color at that pixel.

Figure 3:
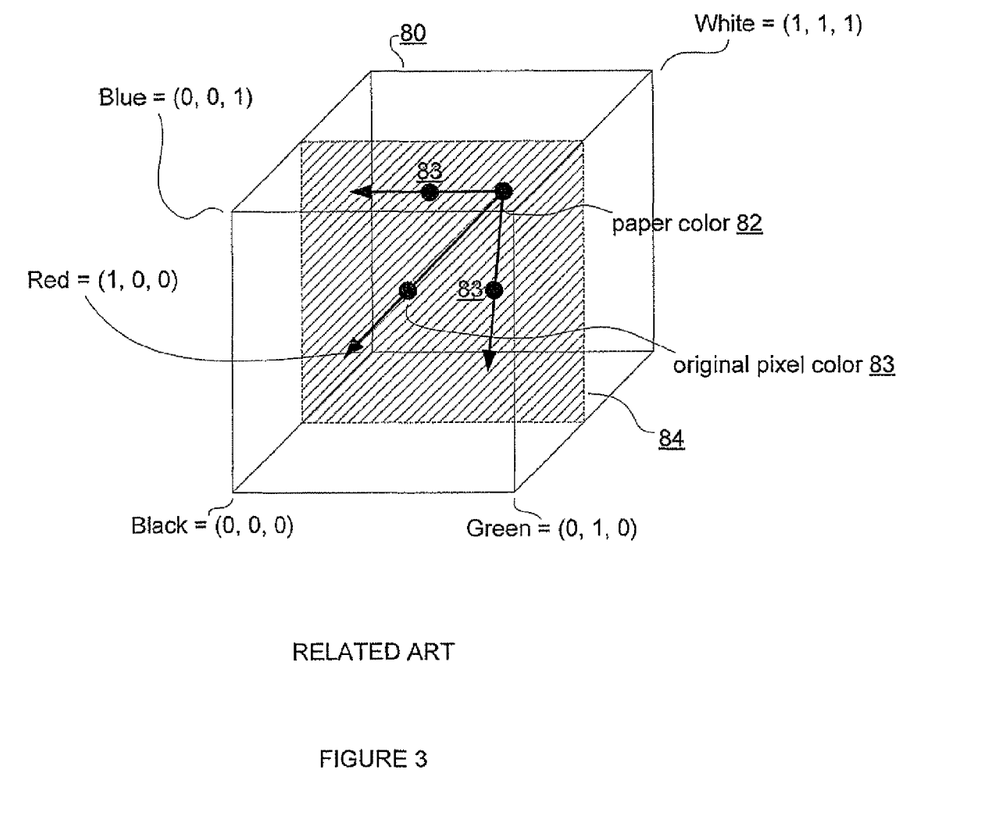
FIG. 3 shows an RGB (red, green, blue) color cube representing RGB color space.
Figure 4:
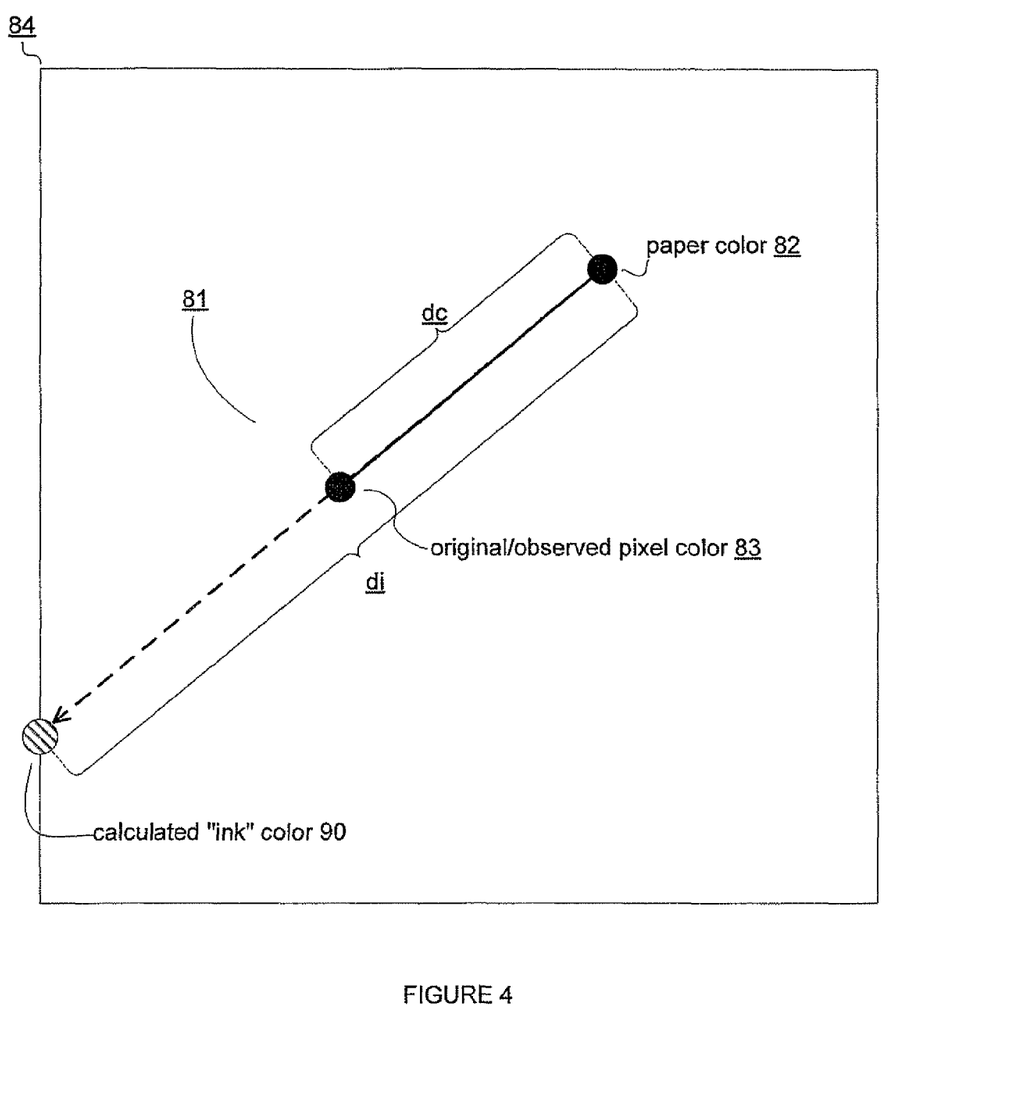
FIG. 4 shows the slice of RGB color cube. For discussion, two-dimensions are used to portray a three dimension or higher color space.

FIG. 3 shows an RGB (red, green, blue) color cube 80 representing RGB color space. For each dimension of color cube 80, its respective color ranges in values from 0 to 1. The techniques described herein are particularly effective when the coloring substance 51 and physical medium 52 to which it is applied to create drawing or subject 54 are such that the transfer or application of color or coloring substance 51 to the paper or physical medium 52 can be approximated by alpha blending. For more information on alpha blending or compositing, see: Porter, Thomas and Duff, Tom, Compositing Digital Images, Computer Graphics, vol. 18, No. 3 (1984), pp. 253-259. Although not limited to this type of application, results for different models of color-medium blending may vary. An alpha-blending model implies that in an RGB color space structure such as color cube 80, the source image has a corresponding collection of rays 81 emanating from a point 82 that corresponds to the paper or medium color. In other words, in the color cube 80, each point 83 representing an observed color for a pixel of an image has a hypothetical corresponding 3D ray 81 in RGB color space that intersects such point 83 and that originates at the paper color point 82. Each such ray 81 terminates in a single point (see point 90 in FIG. 4) where it intersects the RGB color cube 80 boundary. In FIGS. 3 and 4, slice 84 is a slice of color cube 80.

FIG. 4 shows the slice 84 of RGB color cube 80. For discussion, two-dimensions are used to portray a three dimension or higher color space. De-blended color or "ink" point 90 is defined by the intersection of the ray 81 with the boundary of the color cube 80 and corresponds to the automatically calculated de-blended color for the observed pixel color point 83; a pixel in de-blended image 60. FIG. 4 also shows references dc and di. Reference dc is a color distance between paper color 82 and observed pixel color 83. Reference di is a color distance between the paper color 82 and de-blended color or "ink" point 90.

Figure 5:
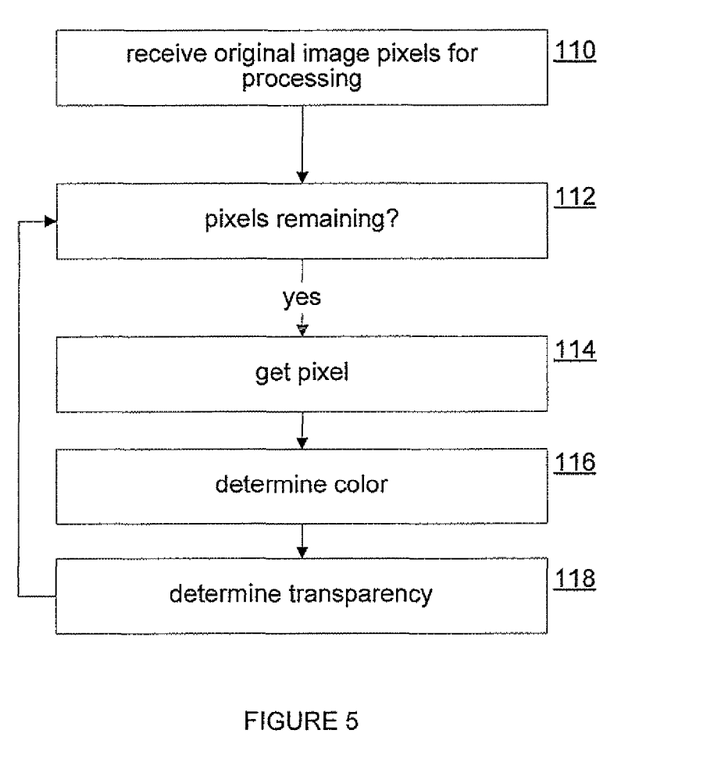
FIG. 5 shows a process for computing pixels for an image.

FIG. 5 shows a process for computing pixels for an image. The process starts with receiving 110 original image pixels for processing. For example, these may be pixels of a captured image 58. While pixels are remaining 112, a pixel to be processed is obtained 114. A de-blended or "ink" color value 90, for example an RGB value, is calculated, determined or found 116 for the pixel. A transparency value or level is also determined or calculated 118 for the pixel. The transparency value is referred to as Alpha, which typically ranges from 0 to 1, where 0 represents full transparency, and 1 represents full opacity. The determined 116/118 RGB value and Alpha together represent a new RGBA pixel (or a new RGBA value for the pixel being processed). The process is repeated until no pixels remain 112.

Figure 6:
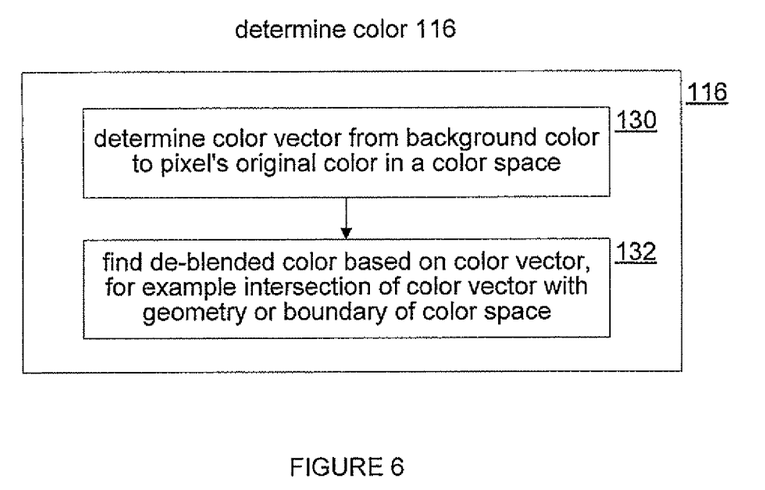
FIG. 6 shows a process for determining a de-blended or "ink" color value.

FIG. 6 shows a process for determining 116 a de-blended or "ink" color value. For the given pixel being processed, a vector 81 in the relevant color space, for instance RGB color cube 80, is determined 130. The vector 81 is computed with paper color 82 as its origin and with original pixel color 83 as another point of the vector. The de-blended or "ink" color value is then found 132 based on the color vector 81. In one embodiment, color value is found 132 by finding the intersection of the color vector 81 with the boundary of the RGB color cube 80. This maximizes transparency. The color value may also be found 132 by using some other point on the vector 81 so long as it lies between the observed color 83, and the ink color 90. This color finding 132 technique is, in general, a technique of extrapolating a de-blended color value for a pixel based primarily on both a given reference color such as paper color and a point in the color space that corresponds to the pixel's observed color.

Using a color vector 81 in an RGB color cube 80 can lead to problems in some cases. In one case, the observed pixel color 83 may be very close to the reference or paper color 82. In this case, significant errors can occur due to quantization of the color space, particularly when processing pixels with 8 bits per color channel. If the observed pixel color 83 is close to the reference or paper color 82, small quantization errors are amplified; computed color vector 81 can deviate significantly and the error is magnified further away at the intersection point 90. In other words, there can be errors in RGB values due to the magnifying effect of extrapolating to the edge of the color cube 80 when small variances in the RGB of the pixel color result in large variances in the RGB of the de-blended "ink" color.

Figure 7:
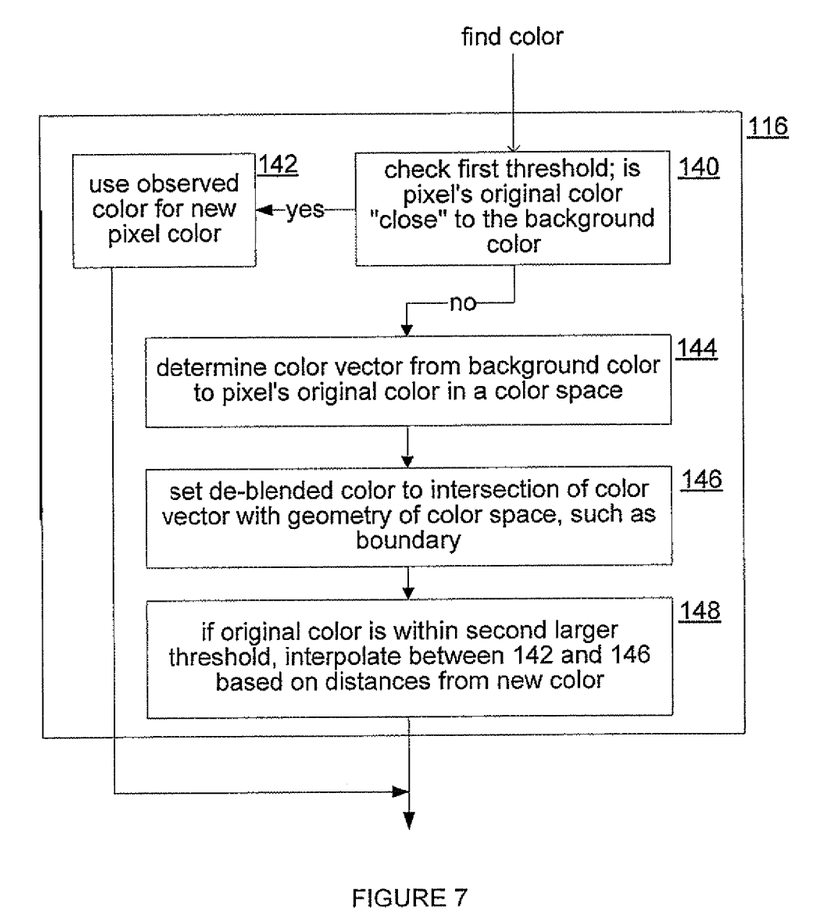
FIG. 7 shows an embodiment of determining a de-blended color that can account for RGB quantization errors.

FIG. 7 shows an embodiment of determining 116 a de-blended color that can account for RGB quantization errors. The general idea is to use a combination of techniques for finding 116 the RGB color. When finding 116 the color for a pixel, a first threshold (see item 160 in FIG. 8) is checked, and if the pixel's observed color is equal or closer 140 to the background color than the observed color is used 142 as the color found 116 for the pixel, and it is set to full transparency. The first threshold can be checked 140 against a color distance between the observed color 83 of the pixel being processed and the reference or background color 82. If the pixel's original observed color is not close 140 to the background color or is outside the first threshold, then color vector 81 is determined 144 from the background color 82 and the pixel's original color 83 (similar to step 130 in FIG. 6). The de-blended color is set 146 to the intersection of the color vector 81 with the geometry or boundary of the color space or RGB color cube 81 (similar to step 132 in FIG. 6). If the pixel's original color 83 is within a second and larger threshold, then the de-blended color set in the step 146 is recomputed by interpolating based on differences between its color distance to the reference color 82 and the first and second thresholds. That is, when the de-blended color point is between the two thresholds, its value is interpolated based on where it lies between the results of steps 140 and 146. This interpolation avoids visual artifacts that would be caused by abruptly switching from one technique (e.g. step 140) to another (e.g. step 146) to find 116 the de-blended color. The thresholds can be fixed, dynamically computed, or set by a user.

Figure 8:
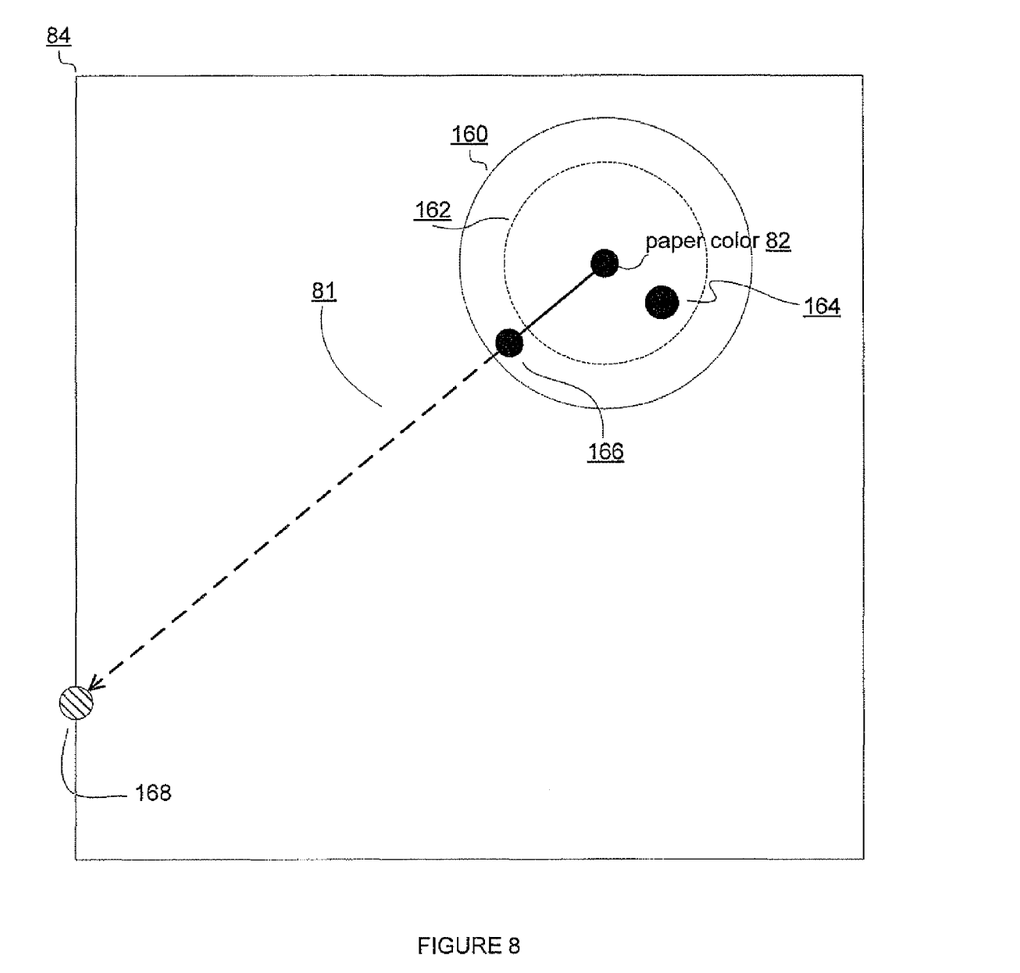
FIG. 8 shows thresholds for avoiding quantization errors.

FIG. 8 shows thresholds 160, 162 for avoiding quantization errors. The first threshold 162 is the first threshold of step 140, and the second threshold 160 is the second threshold of step 148. In FIG. 8, original pixel color point 164 is inside the first threshold 162 and, according to step 140, its de-blended color would be set to the paper color 82, and the Alpha would be set to 0 or fully transparent. In the case where Alpha is set to 0, the color can be set to anything, although a reasonable color is useful to have in place in the event that the pixel's Alpha is later changed to a non-zero value. Original observed pixel color point 166 is between the thresholds 160, 162 and its de-blended RGB value and alpha would be an interpolation between paper color 82 with 0 alpha, and vector-boundary intersection 168 (found in step 146), and an alpha calculated as described in step 182 of FIG. 9.

Figure 9:
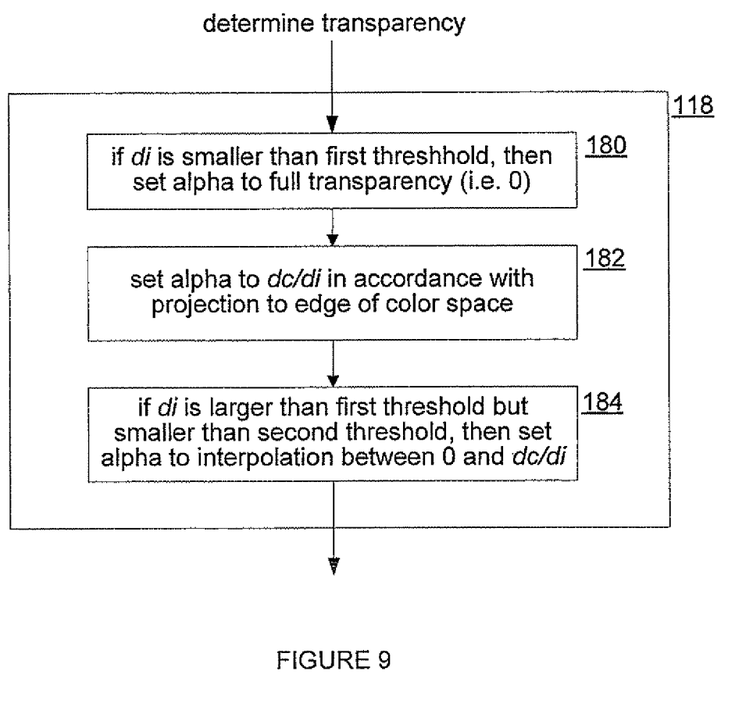
FIG. 9 shows a process for determining transparencies of pixels.

FIG. 9 shows a process for finding 118 transparencies of pixels. In the general case, the transparency for a pixel can be based on its de-blended color point 90, the original pixel color 83, and the paper color 82. More particularly, the Alpha for the pixel can be found 118 by using a ratio of dc/di, where dc is a color distance between paper color 82 and original observed pixel color 83, and where di is the color distance between the paper color 82 and the de-blended color 90. However, as di approaches 0 there are obvious problems with using the ratio dc/di. For improved results, the process of FIG. 9 uses a combination of techniques. First, when finding 118 Alpha, if di according to a projection is smaller than a first threshold 202, then Alpha is set 180 to 0 or full transparency. If di is larger than a second threshold, then Alpha is set 182 to dc/di in accordance with the projection to the edge of the color space. If di is larger than the first threshold 202 but smaller than a second larger threshold 200, then Alpha is set 184 to an interpolation between 0 and dc/di. Although shown as circles, thresholds 200 and 202 are spheres in RGB color space. The first and second thresholds can be static, dynamically calculated, or set by a user. In RGB color space, values of 0.4 and 0.5 are preferred for the first/inner and second/outer thresholds, respectively.

Figure 10:
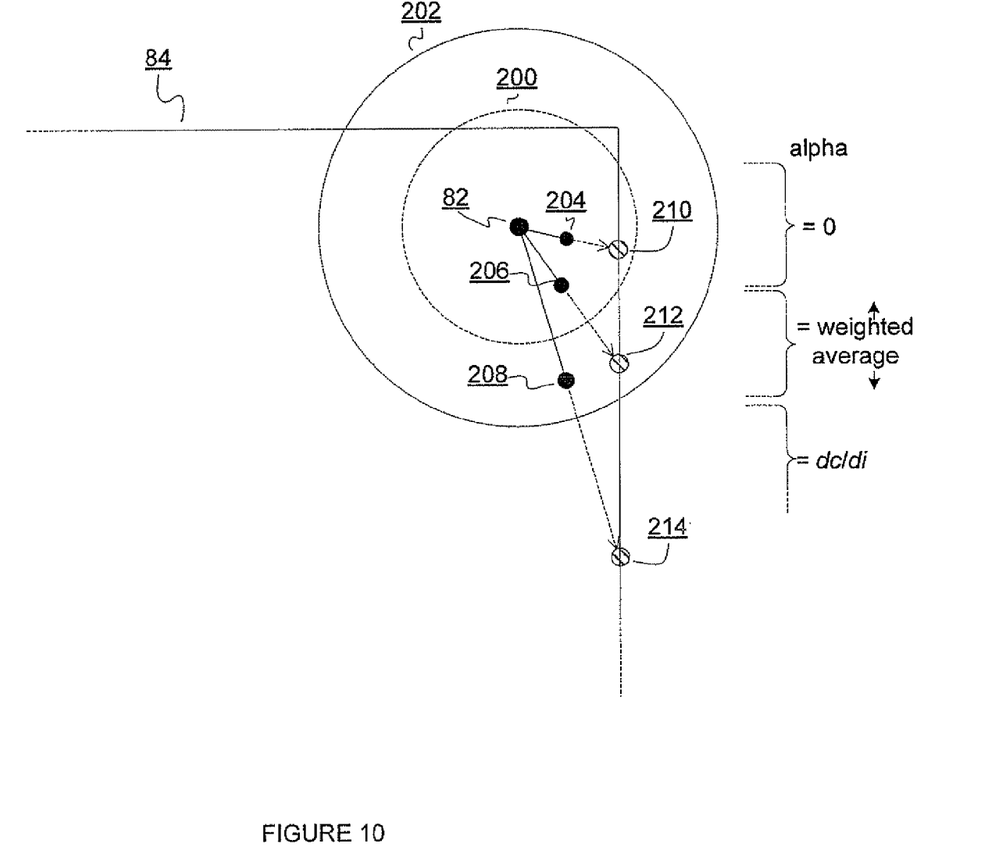
FIG. 10 shows thresholds for calculating or finding transparencies of pixels.

FIG. 10 shows thresholds 200, 202 for finding 118 Alpha. The circles of the thresholds 200 and 202 represent spheres in RGB color space. Points 204, 206, and 208 are original observed pixel colors and points 210, 212, and 214 are their respective projections to the boundary of the color space. According to FIG. 9's transparency determining 118 process, original pixel color 204 has a di less than the first/inner threshold 200 and its Alpha is set 180 to 0 or full transparency. Original pixel color 208 has a di greater than second/outer threshold 202, and its Alpha is set 182 to dc/di according to its projection 214. Original pixel color 206 has a di between the thresholds 200, 202 and therefore its Alpha is set 184 to an interpolation between 0 and the dc/di according to its projection 212. In RGB color space, values of 0.4 and 0.5 are preferred for the first/inner and second/outer thresholds, respectively, when the paper color is near any of the 8 colors of the corners of the RGB color cube 80.

FIGS. 8 and 10 describe similar but different techniques for reducing or compensating for errors or artifacts. FIG. 8 describes thresholds that are used based on dc. The technique in FIG. 8 can compensate for quantization errors magnified as the vector is projected, resulting in a color that could be far from the actual ink color the user desires. FIG. 10 describes a technique for handling errors or artifacts that come up when di is too small. The thresholds in FIG. 10 will usually be different than those in FIG. 8.

The techniques of FIGS. 7, 9, and 10 can be combined in whole or in part to obtain RGBA values for pixels being processed as in FIG. 5.

Although RGB color space is discussed above, the described techniques are equally applicable to other color spaces such as CMYK, and so on. For more information on color spaces, the reader is referred to Computer Graphics: Principles and Practice, second edition, 1990, ISBN 0-201-12110-7, James Foley, Andries Van Dam, Steven Feiner, John Hughes. Of particular relevance are the following sections: chapter 13 (describing color models and color plates depicting the color models), chapter 17 (describing image processing and storing), particularly subsection 6 (describing blending). The color distances are preferably but not limited to Euclidean color distances. Furthermore, any of the processes could be used for multiple reference colors in an image, possibly applied by some priority scheme. Iterating through pixels of an image can involve a screening process by which certain pixels are easily determined to be fully transparent, fully opaque, etc. For example, a pre-scan process could find large areas of paper or background to be rendered transparent. Although de-blended colors were found by projecting vectors to a color space boundary, de-blended colors can also be found along or based on the color vector without reaching the boundary. Choosing the farthest possible point maximizes transparency, which works well for pencil or marker sketches. Other values closer to the original pixel color can work better on photographs. The precise value for the de-blended color can be determined by a user or by an algorithm for detecting properties of the image.

Figure 11:
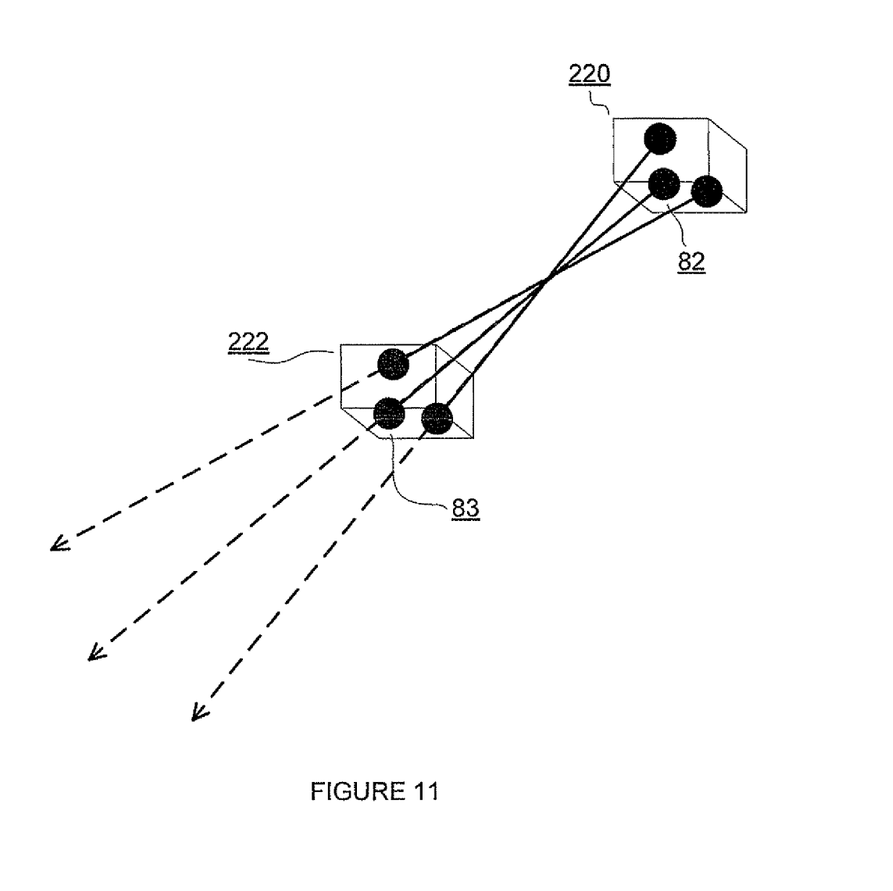
FIG. 11 shows how a range of points near an original pixel color and/or a range of points near a reference color can lead to a spread of color vectors.

Although extrapolation by computing a color vector has been described with vectors defined by color points, the extrapolation can, with less precision, be based on these points. FIG. 11 shows how a range 220 of points near an original pixel color 83 and/or a range of points 222 near reference color 82 can lead to a spread of color vectors. These ranges 220, 222 can result from quantization errors, natural tolerances, minor variations in the general technique, etc. Any of these vectors might produce acceptable results in different circumstances. A pixel color and/or a transparency may be found based on extrapolation from a color point that is based on a reference color and a color point that is based on an original color.

The present invention has been described with respect to a system or method of automated image processing that can automatically determine a color and transparency for a pixel with an observed color for that pixel and a background reference or paper color. A point in a color space can be automatically determined by extrapolating in the color space based on those two points in the color space that respectively correspond to or that respectively approximate the observed color and the given background reference or paper color. A color for the given pixel that corresponds to or approximates the determined point in the color space can also be determined automatically. Based on the determined point and the two points in the color space that respectively correspond to the observed color and the given reference color, a transparency for the pixel can be automatically determined. Transparency for the pixel may be determined based on: a color distance in the color space between the point corresponding to or approximating the paper or reference color and the point corresponding to or approximating the observed color; and a color distance in the color space between the point of the paper or reference color and the determined point. The transparency may be based on a ratio of those color distances. The extrapolation may be performed by finding a point in the color space on an extrapolated color vector in the color space. The determined point may be on the color vector defined by an origin corresponding to the given background reference or paper color and another point in the color space that corresponds to an observed pixel color. Furthermore, the determined point may produce reasonable results when it is at an intersection of the color vector and the boundary of color space.

Although RGB values and Alpha values ranging between 0 and 1 are discussed above, a range between any two numbers could be used. In computer graphics, commonly a range between 0 and 255 is used to express RGB and Alpha values, and a range of 0 to 1 is used herein only as an example. Those skilled in computer graphics will recognize that any range of values could be used.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method, comprising:
processing, by at least one processor, a captured digital image of a physical subject, the subject including a coloring substance applied to a physical medium of a uniform color; and
setting a transparency value for each pixel in a set of pixels of the digital image, using a point of vector computed in a color space of a given digital color representing the uniform color of the medium and a point of vector computed in an observed digital color corresponding to each pixel, where a transparency value for a pixel is determined based on whether each point computed for the given digital color and the observed digital color corresponding to the pixel is beyond a threshold.

2. A method according to claim 1, comprising using both the given digital color representing the uniform color of the medium and the pixel's digital color to find an associated digital color approximating, for a portion of the subject represented by the pixel, the color of the coloring substance de-blended from the physical medium.

3. A computing apparatus configured to perform a method according to claim 1.

4. At least one non-transitory computer-readable storage comprising computer readable instructions that control at least one processor to perform a method according to claim 1.

5. A method comprising:
automatically determining, by at least one processor, colors and transparencies for pixels of an image, using a point of a vector computed in a color space of a given color and a point of a vector computed in an observed digital color that correspond to respective pixels; and
de-bending the given color from the image while preserving hue and saturation of the image, where a transparency value for a pixel is determined based on whether each point computed for the given color and the observed digital color corresponding to the pixel is beyond a threshold.

6. A method as recited in claim 5, wherein said automatically determining comprises:
receiving a first color and a second color; and
determining a transparency and/or a de-blended ink color for a pixel of an image responsive to the first color and the second color.

7. A method according to claim 6, wherein the first color comprises a background color and/or the second color comprises an observed color.

8. A method as recited in claim 5, wherein said automatically determining comprises:
automatically de-blending a given background color of the image from pixels of the digital image by automatically setting transparencies of the pixels based on the given background color and by automatically setting color values of the pixels to extrapolations of their original color based on the given background color.

9. A method as recited in claim 5, wherein said automatically determining comprises:
receiving the color digital image comprising a captured image of a physical subject, where the physical subject comprises a coloring substance applied to a physical medium, where the physical medium without the coloring substance appears to have a uniform color; and
for pixels of the digital image with original color values that captured respective portions of the subject that have the coloring substance applied to the physical medium, setting the color and transparency of a pixel to a new color value that corresponds to a color vector defined by a color value of the uniform color and the original color value of the pixel, and setting a transparency for the pixel based on a color distance to the new color value to which the pixel is set.

10. A method as recited in claim 5, wherein said automatically determining comprises:
comparing two thresholds values with a distance in color space between a reference paper color and an original observed color, where the two thresholds values are a lower threshold and an upper threshold;
if the distance is less than the lower threshold, setting a resulting alpha value to 0;
if the distance is greater than the upper threshold, setting the resulting alpha value to a ratio of the distance between the paper color and the original observed color and a distance between the paper color and an extrapolated color; and
if the distance is between the two thresholds, setting the resulting alpha to an interpolation of (1) the resulting alpha value when the distance is less than the lower threshold and (2) the resulting alpha value when the distance is greater than the upper threshold.

11. A method of automated image processing, comprising:
comparing two threshold values with a distance in color space between a reference paper color and a color calculated by extrapolating a vector between the paper color and the observed color, intersecting that extrapolated vector with a boundary of the color space, where the two thresholds are a lower threshold and an upper threshold;
if the distance is less than the lower threshold, setting a resulting alpha value to substantially 0;
if the distance is greater than the upper threshold, setting the resulting alpha value to a ratio of the distance between the paper color and the observed color and a distance between the paper color and the calculated color;
if the distance is between the two thresholds, using a linear interpolation of (1) the resulting alpha when the distance is less than the lower threshold and (2) the resulting alpha when the distance is greater than the upper threshold.

12. A method as recited in claim 5, wherein said automatically determining comprises:
comparing a threshold value with a distance in color space between a reference paper color and an original observed color;
if the distance is less than the threshold, setting the resulting alpha value to 0; and
if the distance is greater than threshold setting the resulting alpha value to a ratio of the distance between the paper color and the original observed color and the distance between the paper color and an extrapolated color.

13. A method as recited in claim 5, wherein said automatically determining comprises:
comparing a threshold value with a distance in color space between a reference paper color and a color calculated by extrapolating a vector between the paper color and an observed color and intersecting that extrapolated vector with the edge of the color space;
if the distance is less than the threshold, setting the resulting alpha value to 0; and
if the distance is greater than the threshold setting the resulting alpha value to the ratio of the distance between the paper color and the original color and the distance between the paper color and the calculated color.

* * * * *